United States Patent
Okazawa

(10) Patent No.: US 12,427,503 B2
(45) Date of Patent: Sep. 30, 2025

(54) METHOD FOR PRODUCING WATER ABSORBENT RESIN PARTICLES AND AQUEOUS MONOMER SOLUTION

(71) Applicant: SUMITOMO SEIKA CHEMICALS CO., LTD., Hyogo (JP)

(72) Inventor: Shiho Okazawa, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 933 days.

(21) Appl. No.: 17/597,274

(22) PCT Filed: Jul. 2, 2020

(86) PCT No.: PCT/JP2020/026051
§ 371 (c)(1),
(2) Date: Dec. 30, 2021

(87) PCT Pub. No.: WO2021/006179
PCT Pub. Date: Jan. 14, 2021

(65) Prior Publication Data
US 2022/0314198 A1 Oct. 6, 2022

(30) Foreign Application Priority Data

Jul. 5, 2019 (JP) ................. 2019-126346

(51) Int. Cl.
| | | |
|---|---|---|
| *B01J 20/32* | (2006.01) | |
| *B01J 20/10* | (2006.01) | |
| *B01J 20/26* | (2006.01) | |
| *B01J 20/28* | (2006.01) | |
| *C08F 2/10* | (2006.01) | |
| *C08F 2/44* | (2006.01) | |
| *C08F 20/06* | (2006.01) | |
| *C08K 3/36* | (2006.01) | |

(52) U.S. Cl.
CPC ......... *B01J 20/3282* (2013.01); *B01J 20/103* (2013.01); *B01J 20/267* (2013.01); *B01J 20/28016* (2013.01); *C08F 2/10* (2013.01); *C08F 2/44* (2013.01); *C08F 20/06* (2013.01); *C08K 3/36* (2013.01)

(58) Field of Classification Search
CPC .... B01J 20/3282; B01J 20/103; B01J 20/267; B01J 20/28; C08F 2/10; C08F 2/44; C08F 20/06; C08F 220/00; C08F 4/40; C08K 3/36; C08J 3/075; C08J 3/12; C08J 2351/02
See application file for complete search history.

(56) References Cited

U.S. PATENT DOCUMENTS

| | | | |
|---|---|---|---|
| 2009/0298685 A1* | 12/2009 | Torii | .............. A61L 15/18 |
| | | | 502/402 |
| 2019/0085104 A1 | 3/2019 | Yoon et al. | |
| 2019/0119452 A1 | 4/2019 | Yoon et al. | |

FOREIGN PATENT DOCUMENTS

| | | |
|---|---|---|
| EP | 0467073 | 1/1992 |
| EP | 1440984 | 7/2004 |
| EP | 2891520 | 7/2015 |
| JP | H1-318021 | 12/1989 |
| JP | H3-031306 | 2/1991 |
| JP | H3-115313 | 5/1991 |
| JP | H7-119246 B2 | 12/1995 |
| JP | H9-309916 | 12/1997 |
| JP | 2001-089527 | 4/2001 |
| JP | 2001-104959 | 4/2001 |
| JP | 2006-089402 | 4/2006 |

OTHER PUBLICATIONS

The extended European Search Report of European Patent Application No. 20837605.3, Jul. 5, 2023, 9 pages.
Yamanaka Koji, "Water Qualities and the Treatment Systems for Various Industries", Japan Society of Colour Material, 77(11), Nov. 20, 2004, pp. 507-510; Partial translation provided.
Kobayashi Reiji, "Laboratory Water", The Chemical Times 2014 No. 3 (vol. 233), Jul. 1, 2014, pp. 12-17; Partial translation provided.
"GPS Safety summary Caustic soda (48%)", Mitsui Chemical, Feb. 14, 2014, 6 pages; Partial translation provided.
International Preliminary Report on Patentability of PCT/JP2020/026051, Jan. 20, 2022, 5 pages.
International Search Report of PCT/JP2020/026051, Sep. 8, 2020, 2 pages.

* cited by examiner

*Primary Examiner* — Anthony J Zimmer
*Assistant Examiner* — Jaanzeb C Raja
(74) *Attorney, Agent, or Firm* — HSML P.C.

(57) ABSTRACT

A production method of water-absorbent resin particles is disclosed, the method including: preparing a monomer aqueous solution containing an ethylenically unsaturated monomer and silica; polymerizing the ethylenically unsaturated monomer in the monomer aqueous solution by an aqueous solution polymerization method to obtain a hydrogel-like polymer; and coarsely crushing the hydrogel-like polymer, in which a concentration of the silica in the monomer aqueous solution is 0.02 to 4.0 ppm.

3 Claims, No Drawings

METHOD FOR PRODUCING WATER ABSORBENT RESIN PARTICLES AND AQUEOUS MONOMER SOLUTION

TECHNICAL FIELD

The present invention relates to a production method of water-absorbent resin particles, and a monomer aqueous solution.

BACKGROUND ART

Water-absorbent resin particles are widely used in fields of sanitary materials such as disposable diapers and hygiene products, agricultural and horticultural materials such as water retention agents and soil improvement agents, and industrial materials such as waterproofing agents and condensation prevention agents. As water-absorbent resin particles, water-absorbent resin particles, which contain a polymer (crosslinked polymer) having a crosslinking structure and obtained by polymerizing an ethylenically unsaturated monomer, are mainly used.

As a production method of water-absorbent resin particles, a method, in which an ethylenically unsaturated monomer is polymerized by an aqueous solution polymerization method to prepare a hydrogel-like polymer that is a massive hydrogel of a crosslinked polymer, and thereafter coarse crushing, drying, and pulverizing are performed to obtain water-absorbent resin particles, is known (for example, Patent Literature 1).

CITATION LIST

Patent Literature

[Patent Literature 1] Japanese Unexamined Patent Publication No. H9-309916

SUMMARY OF INVENTION

Technical Problem

When the hydrogel-like polymer is coarsely crushed, because a part of the coarsely crushed gel adheres to the inner surface of a coarse crusher, the recovery rate after coarse crushing does not attain 100% with respect to the total amount of the hydrogel-like polymer charged.

In addition, when unreacted monomers that have not been used for polymerization remain in the finally obtained water-absorbent resin particles, problems such as a deterioration of absorption performance, influence on the skin during use (skin lash), and generation of odor may occur.

An object of the present invention is to provide a production method capable of obtaining water-absorbent resin particles in which a yield at the time of coarse crushing is better and a residual monomer is reduced.

Solution to Problem

One aspect of the present invention relates to a production method of water-absorbent resin particles is disclosed, the method including: preparing a monomer aqueous solution containing an ethylenically unsaturated monomer and silica; polymerizing the ethylenically unsaturated monomer in the monomer aqueous solution by an aqueous solution polymerization method to obtain a hydrogel-like polymer; and coarsely crushing the hydrogel-like polymer. A concentration of the silica in the above-mentioned monomer aqueous solution is 0.02 to 4.0 ppm.

In the above-mentioned production method, the ethylenically unsaturated monomer preferably contains at least one of acrylic acid or a salt thereof.

Preparing the above-mentioned monomer aqueous solution includes adjusting a concentration of silica in water which is for preparing the above-mentioned monomer aqueous solution.

Another aspect of the present invention relates to a monomer aqueous solution including: an ethylenically unsaturated monomer; and silica, in which a concentration of the silica is 0.02 to 4.0 ppm.

In the above-mentioned monomer aqueous solution, the ethylenically unsaturated monomer preferably contains at least one of acrylic acid or a salt thereof.

The above-mentioned monomer aqueous solution is for manufacturing water-absorbent resin particles.

Advantageous Effects of Invention

According to the production method of the present invention, water-absorbent resin particles in which a yield at the time of coarse crushing is better and a residual monomer is reduced can be obtained.

DESCRIPTION OF EMBODIMENTS

In the present specification, "acrylic" and "methacryl" are collectively referred to as "(meth)acrylic". Similarly, "acrylate" and "methacrylate" are also referred to as "(meth)acrylate". "(Poly)" means both of a case where there is a prefix of "poly" and a case where there is no prefix thereof. In a numerical value range described in stages in the present specification, an upper limit value or a lower limit value of the numerical value range of a stage can be optionally combined with the upper limit value or the lower limit value of the numerical value range of another stage. In a numerical value range described in the present specification, the upper limit value or the lower limit value of the numerical value range may be replaced with the value shown in the examples. "Water-soluble" means that it exhibits a solubility in water of 5% by mass or more at 25° C. Materials exemplified in the present specification may be used alone, or may be used in combination of two or more. The content of each component in the composition means the total amount of a plurality of substances present in the composition in a case where the plurality of substances corresponding to each component are present in the composition, unless otherwise specified. "Physiological saline" refers to 0.9% by mass sodium chloride aqueous solution.

A production method of water-absorbent resin particles of the present embodiment includes preparing a monomer aqueous solution containing an ethylenically unsaturated monomer and silica; polymerizing the ethylenically unsaturated monomer in the monomer aqueous solution by an aqueous solution polymerization method to obtain a hydrogel-like polymer; and coarsely crushing the hydrogel-like polymer.

Preparation of Monomer Aqueous Solution

The monomer aqueous solution used in the production method of the present embodiment can be prepared by adding an ethylenically unsaturated monomer, and other materials used as necessary to water, for example. The monomer aqueous solution in the present specification refers to a state in which it can be directly subjected to subsequent polymerization without requirement of further addition or removal of water, materials, or the like.

As a raw material water which is for preparing the monomer aqueous solution (hereinafter, also referred to as "water for the monomer aqueous solution"), common industrial water, for example, water acquired from a river or lake, ground water, or the like can be used. As the water for the monomer aqueous solution, water obtained by subjecting the raw material water to treatment such as pretreatment, distillation, membrane separation treatment, and deionization treatment, which will be described later, can be used if necessary. A plurality of these treatments may be combined.

The main turbid matter can be removed by the pretreatment. Examples of the pretreatment include sand filtration treatment, flocculation reaction treatment with chemicals, and pressure flotation separation treatment. As a filtering medium in the sand filtration treatment, natural sands, anthracites, garnets, ceramic sands, activated carbons, manganese sands, and the like can be used, for example.

By the membrane separation treatment, fine impurities in water can be further removed. The membrane separation treatment is performed using a separation membrane having pores. Examples of the separation membrane include a microfiltration membrane (MF membrane), an ultrafiltration membrane (UF membrane), and a reverse osmosis membrane (RO membrane). As the separation membrane, it is preferable to use an ultrafiltration membrane or a reverse osmosis membrane. For the membrane separation treatment, one kind may be used alone, or two or more kinds may be used in combination.

Examples of a filtration method of the separation membrane include centrifugal filtration, pressure filtration, and cross-flow filtration. The shape of a filtration membrane can be appropriately selected, and a form such as a hollow fiber type, a spiral type, a tubular type, and a flat membrane type can be used, for example. A material of the filtration membrane is not particularly limited, and organic membranes such as polyethylene, polyvinylidene fluoride, tetrafluoroethylene, polypropylene, cellulose acetate, polyacrylonitrile, polyamide, polysulfone, and polyethersulfone; and inorganic membranes such as silica, alumina, zirconia, and titania can be used, for example.

The microfiltration membrane may have a pore diameter of about 0.01 to 10 μm, for example. The material of the microfiltration membrane may be a polymer membrane or a ceramic membrane, for example. The filtration method may be a dead-end filtration method in which water flows perpendicularly to a filtration surface.

The ultrafiltration membrane may have the pore diameter of about 0.001 to 0.1 μm, and preferably has the pore diameter of 0.02 to 0.1 μm, for example. The molecular weight cut-off of the ultrafiltration membrane may be 1000 to 500000, 2000 to 200000, or 5000 to 100000, for example. The ultrafiltration membrane can separate substances finer than the microfiltration membrane. When the ultrafiltration membrane is used, a cross-flow method in which water flows parallel to a filtration surface is used, for example.

The reverse osmosis membrane is a separation membrane utilizing the reverse osmosis phenomenon. The reverse osmosis membrane usually has pores of a few nanometers or less. Examples of materials of the reverse osmosis membrane include cellulose acetate, aromatic polyamide, polyvinyl alcohol, polysulfone, and polyethersulfone. As the reverse osmosis membrane, a hollow fiber membrane type, a spiral membrane type, or a flat membrane disc type can be used, for example. The reverse osmosis membrane may be a high pressure type reverse osmosis membrane, a low pressure type reverse osmosis membrane, an ultralow pressure type osmosis membrane, or the like, for example.

Impurities in water can be further removed by the deionization treatment. The deionization treatment is preferably performed after the above-mentioned pretreatment. The deionization treatment can be performed using an ion-exchange resin, an ion-exchange membrane, or the like, for example. When the ion-exchange resin is used, for example, by passing water through an H-type cation-exchange resin and an OH-type anion-exchange resin, cations in water are replaced with hydrogen ions and anions are replaced with hydroxide ions.

The deionization treatment can be performed by an apparatus including a column filled with the ion-exchange resin, for example. For example, the column filled with the ion-exchange resin may be a mixed column type in which a cation-exchange resin and an anion-exchange resin are mixed to fill one column, or may be a multi-bed column in which each of the resins fills different columns. As an example of the multi-bed column type, a two-bed three-column type may be used. In the case of the two-bed three-column type, it is constituted of an H column, a decarboxylation column, and an OH column.

As the ion-exchange resin, a resin in which a functional group is introduced into a parent polymer to impart an ion-exchange function can be used, for example. Examples of the cation-exchange resin include a strong acid cation-exchange resin having a strong acid group such as a sulfonic acid group, and a weak acid cation-exchange resin having a weak acid group such as a carboxy group. Examples of the anion-exchange resin include a strong basic anion-exchange resin having a strong base such as a quaternary ammonium group, and a weak basic anion-exchange resin having a weak base such as primary to secondary amino groups. For the ion-exchange resin, one kind may be used alone, or two or more kinds may be used in combination.

Impurities in water can be removed by distillation. Distillation can be performed by a known method, and can be performed by heating water and cooling vaporized steam to condense, for example.

The concentration of the silica in the monomer aqueous solution is 0.02 to 4.0 ppm. When the concentration of the silica in the monomer aqueous solution is 0.02 ppm or more, the yield when coarsely crushing the obtained massive hydrogel-like polymer can be improved. Furthermore, when the concentration of the silica in the monomer aqueous solution is 4.0 ppm or less, the content of residual monomers in the finally obtained water-absorbent resin particles can be reduced. The reason why such effects are obtained is not clear, but the inventor of the present invention speculates as follows. It is thought that, when the monomer aqueous solution used for polymerization contains silica, in a certain amount or more, re-adhesion between hydrogel-like polymers in a coarse crusher can be prevented, which increases the amount that can be recovered from the coarse crusher. Furthermore, it is thought that, when the concentration of the silica in the monomer aqueous solution is equal to or less than a certain level, this can prevent polymerization inhibition and reduce the amount of the monomer finally remaining as the monomer itself. However, the present invention is not limited to the above-mentioned mechanism.

The concentration of the silica in the monomer aqueous solution may be 0.05 ppm or more, 0.08 ppm or more, 0.10 ppm or more, or 0.12 ppm or more. The concentration of the silica in the monomer aqueous solution may be 3.5 ppm or less, 3.0 ppm or less, 2.5 ppm or less, 2.0 ppm or less, 1.5 ppm or less, 1.0 ppm or less, or 0.8 ppm or less.

The mass ratio of the silica to the monomer in the monomer aqueous solution may be 0.025 ppm or more, 0.03 ppm or more, 0.04 ppm or more, 0.05 ppm or more, 0.1 ppm or more, 0.15 ppm or more, 0.2 ppm or more, 0.3 ppm or more, 0.4 ppm or more, 0.5 ppm or more, or 0.6 ppm or more, for example. The mass ratio of the silica to the monomer in the monomer aqueous solution mays be 20 ppm or less, 15 ppm or less, 10 ppm or less, 5 ppm or less, 3 ppm or less, 2.5 ppm or less, 2 ppm or less, 1.5 ppm or less, or 1.1 ppm or less, for example.

The type of the silica is not particularly limited, and the silica may be natural or synthetic and may be crystalline or amorphous. Synthetic amorphous silica may be wet type silica or dry type silica. The silica may be in the form of colloidal silica. The colloidal silica may be a colloidal solution in which amorphous monodisperse spherical silicon dioxide particles are dispersed in water, for example.

The particle diameter of the silica may be 0.01 to 50 μm, for example. When the silica is contained as colloidal silica in the monomer aqueous solution, the particle diameter of the silica particles in the colloidal silica may be 0.01 to 0.3 μm, for example. When the silica is contained as synthetic amorphous silica in the monomer aqueous solution, the particle diameter of the synthetic amorphous silica may be 0.1 to 50 μm, for example.

Measurement of the average particle diameter and particle diameter distribution of the silica can be performed by a method of measuring a plurality of particles to obtain an average value by measuring the particle diameter (average of the longest diameter and the shortest diameter) of individual particles from a high-magnification image of 10000 times or more with a transmission electron microscope, or a method of using a laser diffraction type particle diameter distribution measurement device, for example. In addition, when a commercially available product is used, the catalog value thereof can be used substitutively.

The concentration of the silica in the monomer aqueous solution can be calculated from the concentration of silicon in the aqueous solution measured by an ICP-AES method. When the silica is added to the monomer aqueous solution to adjust the concentration of the silica, the concentration of silica in the aqueous solution before adding silica may be preliminarily obtained, and the final concentration of the silica in the monomer aqueous solution may be calculated based on the amount of the silica, added. In addition, when a silicon-containing compound other than the silica is added and used, the concentration of the silicon derived from the silicon-containing compound is not included in the concentration of the silica in the present embodiment. The concentration of the silica in the monomer aqueous solution is preferably calculated by summing the amount of the preliminarily measured concentration of silica in the water for the monomer aqueous solution alone before adding a material such as an ethylenically unsaturated monomer, and the known amount of silica added as necessary.

When preparing the monomer aqueous solution, the concentration of the silica in the water for the monomer aqueous solution may be adjusted. Adjusting the concentration of the silica in the water for the monomer aqueous solution may be reducing or increasing the concentration of the silica, in the water for the monomer aqueous solution, for example. Reducing the concentration of the silica in the water for the monomer aqueous solution can be performed by treatment such as the above-mentioned pretreatment, distillation, membrane separation treatment, and deionization treatment. Increasing the concentration of the silica in the water for the monomer aqueous solution can be performed by adding silica, for example. Adding silica may be performed with respect to the water for the monomer aqueous solution, or may be performed with respect to water obtained after adding at least a part of necessary materials to the water for the monomer aqueous solution.

The monomer aqueous solution contains an ethylenically unsaturated monomer. The ethylenically unsaturated monomer is preferably water-soluble, and examples thereof include a carboxylic acid-based monomer such as $\alpha,\beta$-unsaturated carboxylic acid such as (meth)acrylic acid, maleic acid, maleic acid anhydride, and fumaric acid, and salts thereof; a nonionic monomer such as (meth)acrylamide, N,N-dimethyl (meth)acrylamide, 2-hydroxyethyl (meth)acrylate, N-methylol (meth)acrylamide, and polyethylene glycol mono(meth)acrylate; an amino group-containing unsaturated monomer such as N,N-diethylaminoethyl (meth)acrylate, N,N-diethylaminopropyl (meth)acrylate, and diethylaminopropyl (meth)acrylamide, and quaternized products thereof; and a sulfonic acid-based monomer such as sulfonic acid, styrene sulfonic acid, 2-(meth)acrylamide-2-methylpropane sulfonic acid, and 2-(meth)acryloylethane-sulfonic acid, and salts thereof. For these ethylenically unsaturated monomers, one kind may be used alone, or two or more kinds may be used in combination.

The ethylenically unsaturated monomer is preferably at least one selected from the group consisting of (meth)acrylic acid and salts thereof, (meth)acrylamide, and N,N-dimethylacrylamide. Specifically, the ethylenically unsaturated monomer is preferably at least one selected from (meth)acrylic acid and salts thereof. Furthermore, (meth)acrylic acid and salts thereof may be copolymerized with another ethylenically unsaturated monomer and used. In this case, it is preferable to use 70 to 100 mol % of the above-mentioned (meth)acrylic acid and salts thereof, it is more preferable to use 80 to 100 mol % thereof, and it is further preferable to use 90 to 100 mol % thereof in the total amount of the ethylenically unsaturated monomer. The ethylenically unsaturated monomer preferably contains at least one of acrylic acid or salts thereof.

When the ethylenically unsaturated monomer has an acid group such as (meth)acrylic acid and 2-(meth)acrylamide-2-methylpropane sulfonic acid, one in which this acid group is preliminarily neutralized by an alkaline neutralizing agent can be used if necessary. Examples of such an alkaline neutralizing agent include alkali metal salts such as sodium hydroxide, sodium carbonate, sodium hydrogen carbonate, potassium hydroxide, and potassium carbonate; and ammonia. These alkaline neutralizing agents may be used as an aqueous solution to simplify a neutralizing operation. For the alkaline neutralizing agent, one kind may be used alone, or two or more kinds may be used in combination. Neutralization of the acid group may be performed before polymerization of the ethylenically unsaturated monomer that is a raw material, or may be performed during the polymerization or after the polymerization.

The degree of neutralization of the ethylenically unsaturated monomer by the alkaline neutralizing agent is usually preferably 10 to 100 mol %, more preferably 30 to 90 mol %, further preferably 40 to 85 mol %, and even further preferably 50 to 80 mol %, from the viewpoint of enhancing water absorption performance by increasing the osmotic pressure of the obtained water-absorbent resin particles, and not causing safety problems due to the presence of the excess alkaline neutralizing agent. The degree of neutralization is a degree of neutralization with respect to all acid groups contained in the ethylenically unsaturated monomers.

The concentration of the ethylenically unsaturated monomer in the monomer aqueous solution may be usually equal to or more than 20% by mass and equal to or less than a saturation concentration, and is preferably 25 to 70% by mass and more preferably 30 to 50% by mass.

The monomer aqueous solution may contain a polymerization initiator. The polymerization of the monomer contained in the monomer aqueous solution is started by adding a polymerization initiator to the monomer aqueous solution, and performing heating, irradiating with light, or the like, if necessary. Examples of the polymerization initiator include a photopolymerization initiator and a radical polymerization initiator, and among these, a water-soluble radical polymerization initiator is preferably used. The polymerization initiator may be an azo-based compound, a peroxide, or the like, for example.

Examples of the azo-based compound include azo-based compounds such as 2,2'-azobis[2-(N-phenylamidino)propane]dihydrochloride, 2,2-azobis{2-[N-(4-chlorophenyl)amidino]propane}dihydrochloride, 2,2-azobis{2-[N-(4-hydroxyphenyl)amidino]propane}dihydrochloride, 2,2-azobis[2-(N-benzylamidino)propane]dihydrochloride, 2,2'-azobis[2-(N-allylamidino)propane]dihydrochloride, 2,2'-azobis(2-amidinopropane)dihydrochloride, 2,2'-azobis{2-[N-(2-hydroxyethyl)amidino]propane}dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(2,5,6,7-tetrahydro-1H-1,3-diazepin-2-yl)propane]dihydro chloride, 2,2'-azobis[2-(5-hydroxy-3,4,5,6-tetrahydropyrimidin-2-yl)propane]dihydrochloride, 2,2'-azobis{2-[1-(2-hydroxyethyl)-2-imidazolin-2-yl]propane}dihydrochloride, 2,2'-azobis(2-methylpropionamide)dihydrochloride, 2,2'-azobis[2-(2-imidazolin-2-yl)propane]disulfate dihydrate, 2,2'-azobis[N-(2-carboxyethyl)-2-methylpropionamidine]tetrahydrate, and 2,2'-azobis[2-methyl-N-(2-hydroxyethyl)propionamide]. From the viewpoint of easily obtaining water-absorbent resin particles having good water absorption performance, 2,2'-azobis(2-amidinopropane)dihydrochloride, 2,2'-azobis{2[1-(2-hydroxyethyl)-2-imidazolin-2-yl]propane}dihydrochloride, and 2,2'-azobis[N-2-carboxyethyl)-2-methylpropionamidine]tetrahydrate are preferred. For the azo-based compound, one kind may be used alone, or two or more kinds may be used in combination.

Examples of the peroxide include peroxides such as persulfates such as potassium persulfate, ammonium persulfate, and sodium persulfate; organic peroxides such as methyl ethyl ketone peroxide, methyl isobutyl ketone peroxide, di-t-butyl peroxide, t-butyl cumyl peroxide, t-butyl peroxyacetate, t-butyl peroxyisobutyrate, and t-butyl peroxypivalate; and hydrogen peroxides. Among these peroxides, from the viewpoint of obtaining water-absorbent resin particles having good water absorption performance, potassium persulfate, ammonium persulfate, sodium persulfate, and hydrogen peroxide are preferably used, and potassium persulfate, ammonium persulfate, and sodium persulfate are more preferably used. For these peroxides, one kind may be used alone, or two or more kinds may be used in combination.

Furthermore, the polymerization initiator and a reducing agent can be used in combination to be used as a redox polymerization initiator. Examples of the reducing agent include sodium sulfite, sodium hydrogen sulfite, ferrous sulfate, and L-ascorbic acid.

The total use amount of the polymerization initiator is preferably 0.005 to 1 mol, more preferably 0.01 to 0.5 mol, further preferably 0.0125 to 0.1 mol, and even further preferably 0.015 to 0.05 mol with respect to 100 mol of the ethylenically unsaturated monomer used in the polymerization from the viewpoint of avoiding a rapid polymerization reaction and shortening a polymerization reaction time.

The monomer aqueous solution preferably contains an internal crosslinking agent. By containing the internal crosslinking agent, the obtained crosslinked polymer can have crosslinking by the internal crosslinking agent, in addition to self-crosslinking by the polymerization reaction as an internal crosslinking structure thereof. As the internal crosslinking agent, for example, a compound having two or more polymerizable unsaturated groups is used, and a compound having two polymerizable unsaturated groups is preferably used. Examples thereof include di or tri (meth)acrylic acid esters of polyols such as (poly)ethylene glycol, (poly)propylene glycol, trimethylolpropane, glycerin polyoxyethylene glycol, polyoxypropylene glycol, and (poly)glycerin; unsaturated polyesters obtained by reacting the above-mentioned polyol with unsaturated acids such as maleic acid and fumaric acid; bisacrylamides such as N,N'-methylenebis (meth)acrylamide; di or tri (meth)acrylic acid esters obtained by reacting a polyepoxide with (meth)acrylic acid; carbamyl di(meth)acrylate esters obtained by reacting a polyisocyanate such as tolylene diisocyanate and hexamethylene diisocyanate with hydroxyethyl (meth)acrylate; allylated starch; allylated cellulose; diallyl phthalate; N,N',N"-triallyl isocyanurate; and divinylbenzene.

Furthermore, in addition to the above-mentioned compound having two or more polymerizable unsaturated groups, a compound having two or more reactive functional groups can be used as the internal crosslinking agent. Examples thereof include glycidyl group-containing compounds such as (poly)ethylene glycol diglycidyl ether, (poly)propylene glycol diglycidyl ether, and (poly)glycerin diglycidyl ether; (poly)ethylene glycol; (poly)propylene glycol; (poly)glycerin; pentaerythritol; ethylenediamine; polyethyleneimine; and glycidyl (meth)acrylate. Among these, (poly)ethylene glycol diglycidyl ether, (poly)propylene glycol diglycidyl ether, and (poly)glycerin diglycidyl ether are preferable from the viewpoint of better reactivity at low temperature. For these internal crosslinking agents, one kind may be used alone, or two or more kinds may be used in combination.

When the internal crosslinking agent is used, the use amount thereof is preferably 0.0001 mol or more, more preferably 0.001 mol or more, further preferably 0.003 mol or more, and even further preferably 0.01 mol or more with respect to 100 mol of the ethylenically unsaturated monomer to sufficiently enhance water absorption performance such as the water-absorbing ability of the obtained water-absorbent resin particles.

The addition of the internal crosslinking agent contributes to insolubility of the crosslinked polymer and a suitable water-absorbing ability, but an increase in the addition amount of the internal crosslinking agent leads to a deterioration of the water-absorbing ability of the obtained water-absorbent resin particles, and therefore the amount of the internal crosslinking agent is preferably 0.50 mol or less, more preferably 0.25 mol or less, and further preferably 0.05 mol or less with respect to 100 mol of the ethylenically unsaturated monomer.

Other Components

The monomer aqueous solution may contain an additive such as a chain transfer agent and a thickener if necessary.

Examples of the chain transfer agent include thiols, thiolic acids, secondary alcohols, hypophosphorous acid, and phosphorous acid. Examples of the thickener include carboxymethyl cellulose, hydroxyethyl cellulose, hydroxypropyl cellulose, methyl cellulose, polyethylene glycol, polyacrylic acid, neutralized products of polyacrylic acid, and polyacrylamide. For these, one kind may be used alone, or two or more kinds may be used in combination. A water-soluble organic solvent or the like other than water may be appropriately blended in the monomer aqueous solution.

Polymerization

Using the monomer aqueous solution prepared as described above, the ethylenically unsaturated monomer in the monomer aqueous solution is polymerized by the aqueous solution polymerization method. The polymerization method may be a static polymerization method in which polymerization is performed in a state where the monomer aqueous solution is not stirred (for example, a static state), or a stirring polymerization method in which polymerization is performed while stirring the monomer aqueous solution in a reaction apparatus, for example. It is preferable to obtain a hydrogel-like polymer by aqueous solution static polymerization which is the static polymerization method. In the static polymerization method, when the polymerization is completed, a single block-shaped hydrogel-like polymer occupying substantially the same volume as the monomer aqueous solution present in a reaction container is obtained.

The form of manufacturing may be batch, semi-continuous, continuous, or the like. For example, in aqueous solution polymerization, in aqueous solution static continuous polymerization, a polymerization reaction can be performed while continuously supplying the monomer aqueous solution to a continuous polymerization apparatus to obtain a continuous (for example, band-shaped) hydrogel.

The polymerization temperature varies depending on the polymerization initiator used, but is preferably 0° C. to 130° C. and more preferably 10° C. to 110° C. from the viewpoint of rapidly advancing the polymerization and shortening the polymerization time to enhance productivity, and further easily removing polymerization heat to smoothly perform the reaction. The polymerization time is appropriately set according to the type and amount of the polymerization initiator used, the reaction temperature, and the like, but is preferably 1 to 200 minutes, more preferably 5 to 100 minutes.

Hydrogel-Like Polymer

The water content of the massive hydrogel-like polymer obtained by polymerizing the ethylenically unsaturated monomer is preferably 30 to 80% by mass, more preferably 40 to 75% by mass, and further preferably 50 to 70% by mass from the viewpoint of easily performing a coarse crushing step. The water content is adjusted by a water amount of the monomer aqueous solution, or an operation such as drying or humidification after polymerization. The water content of the hydrogel-like polymer is the content, which is expressed by % by mass, occupied by water in the total mass of the hydrogel-like polymer.

Coarse Crushing

The production method of water-absorbent resin particles of the present embodiment includes the step of coarsely crushing the hydrogel-like polymer. By coarse crushing, a coarsely crushed hydrogel product is obtained. The coarsely crushed hydrogel product may be in the form of particles, or may have an elongated shape in which particles are connected. The size of the minimum side of the coarsely crushed hydrogel product may be about 0.1 to 15 mm and preferably about 1.0 to 10 mm, for example. The size of the maximum side of the coarsely crushed hydrogel product may be about 0.1 to 200 mm and preferably about 1.0 to 150 mm.

As the coarse crusher, a kneader (for example, a pressure type kneader, a double arm type kneader, and the like), a meat chopper, a cutter mill, a Pharma Mill, or the like can be used, for example. Among these, a double arm type kneader, a meat chopper, and a cutter mill are more preferable. The coarse crusher may be of the same type as a pulverization apparatus of a gel-dried product to be described later.

When the hydrogel-like polymer is coarsely crushed, the hydrogel-like polymer may be preliminarily cut to an appropriate size (for example, about 5 cm square) before being charged in the coarse crusher.

Drying

The production method of water-absorbent resin particles of the present embodiment preferably includes a step of drying the coarsely crushed hydrogel product By removing a solvent containing water in the coarsely crushed hydrogel product by heat and/or blast, the coarsely crushed hydrogel product can be dried to obtain the gel-dried product. A drying method may be a general method such as natural drying, drying by heat, spray drying, and freeze drying. For example, the drying may be performed under normal pressure or reduced pressure, or may be performed under a stream of nitrogen or the like to improve drying efficiency. For the drying, a plurality of methods may be used in combination. When the drying is performed at normal pressure, the drying temperature is preferably 70° C. to 250° C. and more preferably 80° C. to 200° C. The drying step is performed until the water content of the coarsely crushed gel product is 20% by mass or less, preferably 10% by mass or less, and more preferably 5% by mass or less.

Pulverization

The production method of water-absorbent resin particles of the present embodiment may include a step of further pulverizing the gel-dried product. A gel-pulverized product is obtained by pulverizing the gel-dried product. In the pulverization of the gel-dried product, a known pulverizer can be used, and a roller mill (roll mill), a stamp mill, a jet mill, a high-speed rotary pulverizer (a hammer mill, a pin mill, a rotor beater mill, and the like), a container driving type mill (a rotary mill, a vibration mill, a planetary mill, and the like), or the like can be used, for example. The high-speed rotary pulverizer is preferably used. The pulverizer may have an opening part on the outlet side, such as perforated plates, screens, or grids, for controlling the maximum particle diameter of pulverized particles. The shape of the opening part may be polygonal, circular, or the like, and the maximum diameter of the opening part may be 0.1 to 5 mm, preferably 0.3 to 3.0 mm, and more preferably 0.5 to 1.5 mm Classification The production method of water-absorbent resin particles of the present embodiment may include a step of classifying the gel-pulverized product. The classification refers to an operation of dividing a certain particle group into two or more particle groups having different particle diameter distributions according to particle diameters. Furthermore, a plurality of classification steps may be performed by pulverizing the particles again after classification and repeating the pulverization step and the classification step, or the classification step may be performed after a surface crosslinking step to be described later.

A known classification method can be used for the classification of the gel-pulverized product, and for example, screen classification, wind power classification, or the like may be used, and screen classification is preferable. Examples of the screen classification include a vibrating sieve, a rotary shifter, a cylindrical stirring sieve, a blower sifter, and a Ro-tap shaker. The screen classification refers to a method of classifying particles on a screen into particles that pass through a mesh of the screen and particles that do not pass through the mesh by vibrating the screen. The wind power classification refers to a method of classifying particles using the flow of air.

For example, the particle diameter of the gel-pulverized product can be adjusted by classification using a sieve having a predetermined opening. Furthermore, the particle diameter may be adjusted to a predetermined range by adjusting the mixing proportion of the classified gel-pulverized product. The particle diameter adjustment may be performed on the finally obtained water-absorbent resin particles.

90% or more of the gel-pulverized product or the finally obtained water-absorbent resin particles with respect to the total weight preferably has the particle diameter of 850 μm or less, more preferably 700 μm or less, and further preferably 600 μm or less. In the present specification, the particle diameter means a particle diameter measured by a sieving method.

The median particle diameter of the gel-pulverized product or water-absorbent resin particles is preferably 100 to 800 μm, more preferably 150 to 700 μm, further preferably 200 to 600 μm, and even further preferably 250 to 500 μm. The median particle diameter can be measured by the following method. JIS standard sieves are combined in the following order from the top: a sieve having the opening of 600 μm, a sieve having the opening of 500 μm, a sieve having the opening of 425 μm, a sieve having the opening of 300 μm, a sieve having the opening of 250 μm, a sieve having the opening of 180 μm, a sieve having the opening of 150 μm, and a tray. 50 g of the water-absorbent resin particles is put in the topmost sieve among the combined sieves, and classification is performed using a Ro-tap shaker (manufactured by Iida-seisakusho Japan Corporation) according to JIS Z 8815 (1994). After classification, the mass of the particles remaining on each sieve is calculated as a mass percentage with respect to the total amount, and the particle diameter distribution is obtained. The relationship between the opening of the sieve and the integrated value of the mass percentage of the particles remaining on the sieve is plotted on logarithmic probability paper by integrating in the order from the one having the largest particle diameter on the sieve with respect to this particle diameter distribution. By connecting the plots on the probability paper with a straight line, the particle diameter corresponding to the cumulative mass percentage of 50% by mass is obtained as the median particle diameter.

Surface Crosslinking

The production method of water-absorbent resin particles of the present embodiment preferably includes a surface crosslinking step after the pulverization step. The surface crosslinking can be performed by adding a crosslinking agent (surface crosslinking agent) for performing the surface crosslinking to the crosslinked polymer and reacting, for example. Addition of the surface crosslinking agent may be performed at any timing after the pulverization step, and can be performed with respect to the gel-pulverized product before or after the classification step, or before or after the drying step. Among these, the addition is preferably performed with respect to the gel-pulverized product, of which the particle diameter has been adjusted, after the drying step and after the classification step. By adding the surface crosslinking agent to perform the surface crosslinking treatment, the crosslinking density in the vicinity of the surface of the crosslinked polymer is increased, which makes it possible to improve water absorption performance of the obtained water-absorbent resin particles.

Addition of the surface crosslinking agent can be performed by adding a surface crosslinking agent solution or by adding a surface crosslinking agent solution through spraying, for example. From the viewpoint of uniformly dispersing the surface crosslinking agent, an aspect of adding the surface crosslinking agent is preferably such that the surface crosslinking agent is dissolved in a solvent such as water and/or alcohol to be added as a surface crosslinking agent solution. Furthermore, the surface crosslinking step may be performed one time, or may be divided into a plurality of times of two or more times.

The surface crosslinking agent may contain two or more functional groups (reactive functional groups) having reactivity with a functional group derived from the ethylenically unsaturated monomer, for example. Examples of the surface crosslinking agent include polyols such as ethylene glycol, propylene glycol, 1,4-butanediol, trimethylolpropane, glycerin, polyoxyethylene glycol, polyoxypropylene glycol, and polyglycerin; polyglycidyl compounds such as (poly)ethylene glycol diglycidyl ether, (poly)glycerin diglycidyl ether, (poly)glycerin triglycidyl ether, (poly)propylene glycol polyglycidyl ether, and (poly)glycerol polyglycidyl ether; haloepoxy compounds such as epichlorohydrin, epibromohydrin, and α-methyl epichlorohydrin; compounds having two or more reactive functional groups such as isocyanate compounds such as 24-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; oxazoline compounds such as 1,2-ethylenebisoxazoline; carbonate compounds such as ethylene carbonate; and hydroxyalkylamide compounds such as bis[N,N-di(β-hydroxyethyl)]adipamide. Among these, polyglycidyl compounds such as (poly)ethylene glycol diglycidyl ether, (poly)glycerin diglycidyl ether, (poly)glycerin triglycidyl ether, (poly)propylene glycol polyglycidyl ether, and (poly)glycerol polyglycidyl ether; and/or polyols such as ethylene glycol, propylene glycol, 1,4-butanediol, trimethylolpropane, polyoxyethylene glycol, and polyoxypropylene glycol are preferable, and polyglycidyl compounds are more preferable. For these surface crosslinking agents, one kind may be used alone, or two or more kinds may be used in combination. For example, polyglycidyl compounds and polyols may be used in combination.

The addition amount of the surface crosslinking agent is usually preferably 0.0001 to 1 mol and more preferably 0.001 to 0.5 mol with respect to 100 mol of the total amount of the ethylenically unsaturated monomer used for the polymerization from the viewpoint of appropriately increasing the crosslinking density in the vicinity of the surface of the water-absorbent resin particles.

The surface crosslinking step is preferably performed in the presence of water in the range of 1 to 200 parts by mass with respect to 100 parts by mass of the ethylenically unsaturated monomer. The water amount can be appropriately adjusted by using a water-soluble organic solvent such as water and/or alcohol. By adjusting the water amount at the time of the surface crosslinking step, crosslinking can be more suitably performed in the vicinity of the particle surface of the water-absorbent resin particles.

The treatment temperature of the surface crosslinking agent is appropriately set according to a surface crosslinking agent used, and may be 20° C. to 250° C., and the treatment time is preferably 1 to 200 minutes and more preferably 5 to 100 minutes.

The surface crosslinking may be performed only one time or may be performed at multiple timings. The surface crosslinking may be performed after the pulverization step, or may be performed after coarse crushing and before pulverization in addition to performance after the pulverization step.

The water-absorbent resin particles of the present embodiment may be constituted of only the crosslinked polymer, but can further contain additional components such as a gel stabilizer, a metal chelating agent (ethylenediaminetetraacetic acid and a salt thereof, diethylenetriamine pentaacetate and a salt thereof, and the like, for example, diethylenetriamine pentasodium pentaacetate), and a flowability improver (lubricant). Additional components can be disposed inside particles of the crosslinked polymer, on the surface thereof, or both thereof.

The water-absorbent resin particles may contain a plurality of inorganic particles disposed on the surface of the crosslinked polymer. For example, by mixing the crosslinked polymer and the inorganic particles, it is possible to dispose the inorganic particles on the surface of the crosslinked polymer. The inorganic particles may be silica particles such as amorphous silica.

In a case where the water-absorbent resin particles include inorganic particles disposed on the surface, the content of the inorganic particles may be in the following range with the total mass of the crosslinked polymer as the base. The content of the inorganic particles may be 0.05% by mass of more, 0.1% by mass or more, 0.15% by mass or more, or 0.2% by mass or more. The content of the inorganic particles may be 5.0% by mass or less, 3.0% by mass or less, 1.0% by mass or less, 0.5% by mass or less, or 0.3% by mass or less.

The average particle diameter of the inorganic particles may be 0.1 to 50 µm, 0.5 to 30 µm, or 1 to 20 µm. The average particle diameter can be measured by a pore electric resistance method or a laser diffraction/scattering method depending on the characteristics of the particles.

The water-absorbent resin particles obtained by the production method of the present embodiment can be used in fields such as sanitary materials such a disposable diapers and hygiene products, agricultural and horticultural materials such as water retention agents and soil improvement agents, and industrial materials such as waterproofing agents and condensation prevention agents, for example.

EXAMPLES

Hereinafter, contents of the present invention will be described in further detail using examples and comparative examples, but the present invention is not limited to the following examples.

Example 1

(Preparation of Water for Monomer Aqueous Solution)

Raw material water (silica concentration 8.7 ppm) acquired from a river was passed through a two-layer filter DM-24L (filtering medium: anthracite, filtered sand) manufactured by Kurita Water Industries Ltd., and thereafter passed through a cross-flow type membrane filter having a hollow fiber ultrafiltration (UF) membrane module made of cellulose acetate (FT50-AC-FUC1583, manufactured by DAICEN MEMBRANE-SYSTEMS Ltd.) to perform ion-exchange treatment with an ion-exchange resin of $H^+$ and $OH^-$ thereafter. The obtained UF membrane-treated ion-exchanged water (silica) concentration 0.15 ppm) was used for manufacturing water-absorbent resin particles.

(Preparation of Monomer Aqueous Solution)

162.8 g (2.26 mol) of 100% acrylic acid was put in a 2 L separable flask. After adding 140.5 g of UF membrane-treated ion-exchanged water while stirring the inside of the separable flask, 141.2 g of 48% by mass sodium hydroxide was added dropwise in an ice bath to prepare an acrylic acid-partially neutralized solution having a monomer concentration of 45% by mass.

444.4 g of the above-mentioned acrylic acid-partially neutralized solution, 72.0 g of UF membrane-treated ion-exchanged water, and 0.071 g (0.408 mmol) of ethylene glycol diglycidyl ether as an internal crosslinking agent were added in a stainless steel container (inner diameter: 200 mm, height: 60 mm) having a stirring bar (diameter 8 mm, length 45 mm), and the components were uniformly dispersed by rotating the stirring bar to obtain a mixture. After replacing the inside of the stainless steel container with nitrogen, the temperature of the above-mentioned mixture was adjusted to 25° C. Subsequently, 8.09 g (0.599 mmol) of a 2% by mass potassium persulfate aqueous solution and 1.70 g of a 0.5% by mass L-ascorbic acid aqueous solution were added dropwise in this order under stirring at 300 rpm to prepare a monomer aqueous solution. The acrylic acid concentration in the monomer aqueous solution was 38%, and the silica concentration in the monomer aqueous solution was 0.14 ppm.

(Polymerization)

Polymerization started immediately after dropwise addition of the above-mentioned 0.5% by mass L-ascorbic acid aqueous solution. After the start of polymerization, with the polymerization reaction proceeding in the monomer aqueous solution, the viscosity of the monomer aqueous solution increased, which stopped the stirring bar. After 15 minutes from the start of the polymerization, the obtained hydrogel-like polymer still being put in the container was immersed in a water bath at 75° C. and aged for 20 minutes. The thickness of the obtained hydrogel-like polymer was about 13 mm.

(Coarse Crushing)

The total amount of the hydrogel-like polymer after aging was taken out from the container, and cut by making cut lines of a grid pattern of 5 cm intervals. The total amount of the cut hydrogel-like polymer was sequentially charged in a meat chopper 12VR-750SDX manufactured by Alpha Royal Co., Ltd. to be coarsely crushed. The diameter of holes in a plate located at the outlet of the meat chopper were 6.4 mm. The coarse crushing was performed until no coarsely crushed gel (coarsely crushed hydrogel product) came out from the plate of the meat chopper. At this time, the amount of the hydrogel-like polymer charged in the meat chopper was 410 g, and the amount of the coarsely crushed hydrogel product discharged and recovered was 353 g. The coarse crushing efficiency was calculated by the following formula. The yield of the coarse crushing step was 86%.

Coarse crushing efficiency (%)=[weight of obtained coarsely crushed hydrogel product/weight of hydrogel-like polymer before coarse crushing]× 100

Subsequently, the coarsely crushed hydrogel product was dried with hot air at 180° C. for 30 minutes to obtain a gel-dried product. After collecting 30 g of the gel-dried product and pulverizing it with a small pulverizer (Wonder Blender WB-1) for 2 seconds, the pulverized product was passed through a sieve having the opening of 850 μm, and particles remaining of the sieve of 106 μm were recovered and used for evaluation to be described later as water-absorbent resin particles. After classification, the recovered water-absorbent resin particles were about 10 g.

Example 2

The UF membrane-treated ion-exchanged water used in Example 1 was further passed through a pure water production apparatus RFD343HA manufactured by ADVANTEC to further perform distillation treatment and ion-exchange treatment, and distillation-treated ion-exchanged water was obtained. The silica concentration of the distillation-treated ion-exchanged water was less than 0.02 ppm. Amorphous silica (Oriental Silicas Corporation, Tokusil NP-S) was added to the distillation-treated ion-exchanged water so that the silica concentration was 1.5 ppm to obtain water having the silica concentration of 1.5 ppm.

A monomer aqueous solution was prepared in the same manner as in Example 1 except that water having the silica concentration of 1.5 ppm was used instead of the UF membrane-treated ion-exchanged water. The silica concentration of the monomer aqueous solution was 0.63 ppm. The same treatment as in Example 1 was performed using the monomer aqueous solution to obtain water-absorbent resin particles. In the coarse crushing step, the amount of the hydrogel-like polymer charged in the meat chopper was 431 g, and the amount of the coarsely crushed hydrogel product discharged and recovered was 346 g. The coarse crushing efficiency was 80%.

Comparative Example 1

The UF membrane-treated ion-exchanged water used in Example 1 was passed through a pure water production apparatus RFD343HA manufactured by ADVANTEC to further perform distillation treatment and ion-exchange treatment, and distillation-treated ion-exchanged water was obtained. The silica concentration of the distillation-treated ion-exchanged water was less than 0.02 ppm.

A monomer aqueous solution was prepared in the same manner as in Example 1 except that the distillation-treated ion-exchanged water was used instead of the UF membrane-treated ion-exchanged water. The silica concentration of the monomer aqueous solution was less than 0.02 ppm. The same treatment as in Example 1 was performed using the monomer aqueous solution to obtain water-absorbent resin particles. In the coarse crushing step, the amount of the hydrogel-like polymer charged in the meat chopper was 409 g, and the amount of the coarsely crushed hydrogel product discharged and recovered was 242 g. The coarse crushing efficiency was 59%.

Comparative Example 2

Amorphous silica (Oriental Silicas Corporation, Tokusil NP-S) was added to the distillation-treated ion-exchanged water used in Comparative Example 1 so that the silica concentration was 10 ppm to prepare water having the silica concentration of 10 ppm.

A monomer aqueous solution was prepared in the same manner as in Example 1 except that water having the silica concentration of 10 ppm was used instead of the UF membrane-treated ion-exchanged water. The silica concentration of the monomer aqueous solution was 4.22 ppm. The same treatment as in Example 1 was performed using the monomer aqueous solution to obtain water absorbent resin particles. In the coarse crushing step, the amount of the hydrogel-like polymer charged in the meat chopper was 422 g, and the amount of the coarsely crushed hydrogel product discharged and recovered was 359 g. The coarse crushing efficiency was 85%.

Comparative Example 3

Amorphous silica (Oriental Silicas Corporation, Tokusil NP-S) was added to the distillation-treated ion-exchanged water used in Comparative Example 1 so that the silica concentration was 1000 ppm to prepare water having the silica concentration of 1000 ppm.

A monomer aqueous solution was prepared in the same manner as in Example 1 except that water having the silica concentration of 1000 ppm was used instead of the UF membrane-treated ion-exchanged water. The silica concentration of the monomer aqueous solution was 404 ppm. The same treatment as in Example 1 was performed using the monomer aqueous solution to obtain water-absorbent resin particles. In the coarse crushing step, the amount of the hydrogel-like polymer charged in the meat chopper was 416 g, and the amount of the coarsely crushed hydrogel product discharged and recovered was 332 g. The coarse crushing efficiency was 80%.

Measurement of Silica Concentration

Regarding measurement of the silica concentration in the various kinds of water used, the silica concentration was obtained by the following method by measuring a Si concentration and converting the Si concentration measured into a $SiO_2$ concentration. The Si concentration in the liquid was measured by an ICP-AES method using an IRIS Advantage type manufactured by Nippon Jarrell-Ash Co., Ltd. The Si concentration was calculated using a calibration curve produced using a silicon standard liquid (1000 ppm) manufactured by FUJIFILM Wako Pure Chemical Corporation. The measured conditions are described below.
Analysis conditions:
Radio frequency output 1350 W
Measurement wavelength: 251.6 nm
Auxiliary gas flow rate: 0.5 L/min
Nebulizer gas pressure: 26 psi
Center tube inner diameter: 2 mm
Pump rotation speed: 130 rpm
Integration time: 15 seconds
Number of measurements: 3 times
Pretreatment step:
No dilution (direct introduction of a sample)

Measurement of Residual Monomer Content

The residual monomer content in the obtained water-absorbent resin particles was measured by the following method. The measurement was performed in the environment of 25° C.±2° C. and the humidity of 50%±10%.

500 g of physiological saline was put in a 500 mL beaker to perform rotation at 600 rpm using a stirrer (stirrer table: model M-16GM manufactured by Koike Precision Instruments, stirrer tip: diameter 0.7 cm, length 3 cm, no rotating ring). 2.0 g of the water-absorbent resin particles was added to the beaker being stirred, and was stirred for 60 minutes. The contents of the above-mentioned beaker were filtered through a JIS standard sieve having the opening of 75 μm and filter paper (filter paper No. 5C manufactured by ADVANTEC) to perform separation into a water-absorbing gel and a filtrate (discharged liquid). The monomer content dissolved in the obtained filtrate was measured by high-performance liquid chromatography. The residual monomer to be measured herein is acrylic acid and alkali metal salts thereof. The measured value was converted into a value per mass of the water-absorbent resin particles and used as the residual monomer content (ppm). The results are shown in Table 1.

TABLE 1

| | Silica concentration in monomer aqueous solution (ppm) | Coarse crushing efficiency (%) | Residual monomer content (ppm) |
|---|---|---|---|
| Example 1 | 0.14 | 86 | 534 |
| Example 2 | 0.63 | 80 | 543 |
| Comparative Example 1 | <0.02 | 59 | 881 |
| Comparative Example 2 | 4.22 | 85 | 1210 |
| Comparative Example 3 | 404 | 80 | 1154 |

In the examples, as compared to the comparative examples, the coarse crushing efficiency was higher, and the residual monomer content in the obtained water-absorbent resin particles was reduced to below.

The invention claimed is:

1. A method of producing water-absorbent resin particles, the method comprising:
    preparing a monomer aqueous solution containing an ethylenically unsaturated monomer and silica;
    polymerizing the ethylenically unsaturated monomer in the monomer aqueous solution by an aqueous solution polymerization method to obtain a hydrogel-like polymer; and
    coarsely crushing the hydrogel-like polymer,
    wherein a concentration of the silica in the monomer aqueous solution is 0.02 to 4.0 ppm.

2. The method according to claim 1, wherein the ethylenically unsaturated monomer contains at least one of acrylic acid or a salt thereof.

3. The method according to claim 1, further comprising adjusting a concentration of silica in water that is used to prepare the monomer aqueous solution.

* * * * *